(12) United States Patent
Rosenberger et al.

(10) Patent No.: US 6,735,997 B2
(45) Date of Patent: May 18, 2004

(54) METHOD FOR PRODUCING A HOUSING FOR A BALL JOINT

(75) Inventors: Klaus Rosenberger, Krefeld (DE); Markus Thölking, Vechta (DE); Detlef Schellack, Dissen (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 12 days.

(21) Appl. No.: 10/204,967

(22) PCT Filed: Jan. 8, 2002

(86) PCT No.: PCT/DE02/00023

§ 371 (c)(1),
(2), (4) Date: Aug. 26, 2002

(87) PCT Pub. No.: WO02/055232

PCT Pub. Date: Jul. 18, 2002

(65) Prior Publication Data

US 2003/0074947 A1 Apr. 24, 2003

(30) Foreign Application Priority Data

Jan. 9, 2001 (DE) .......................................... 101 00 668

(51) Int. Cl.[7] .................................................. B21K 21/08
(52) U.S. Cl. .................................... 72/356; 29/898.048
(58) Field of Search ..................... 29/898.048, 898.045, 29/898.066, 894.362; 72/352, 356, 377, 325

(56) References Cited

U.S. PATENT DOCUMENTS 3,508,428 A * 4/1970 Matson ........................ 72/325
3,795,960 A * 3/1974 Elmore et al. ......... 29/898.066

FOREIGN PATENT DOCUMENTS

| DE | 37 05 426 A1 | 8/1987 | |
|---|---|---|---|
| DE | 195 36 035 A1 | 4/1997 | |
| JP | 60 33848 | 2/1985 | |
| JP | 2-160138 | * 6/1990 | .................. 72/356 |
| JP | 03 176275 | 7/1991 | |
| JP | 4 46652 | 2/1992 | |

* cited by examiner

Primary Examiner—Lowell A. Larson
(74) Attorney, Agent, or Firm—McGlew and Tuttle, P.C.

(57) ABSTRACT

A process is provided for manufacturing a ball-and-socket joint housing by cold forming from a blank (R), which is preferably produced from a bar or wire material and is prepared for forming. A first axial depression (1) with a diameter (D1) is first prepared by reverse cup extrusion. A second axial depression (2) with a comparatively larger diameter (D2) is subsequently prepared in the axial depression (1) by reverse cup extrusion. A diameter reduction (D3) also of the first axial depression (1) is formed in some sections by the deformation of the material during the second reverse cup extrusion.

8 Claims, 2 Drawing Sheets

METHOD FOR PRODUCING A HOUSING FOR A BALL JOINT

Figure 1:
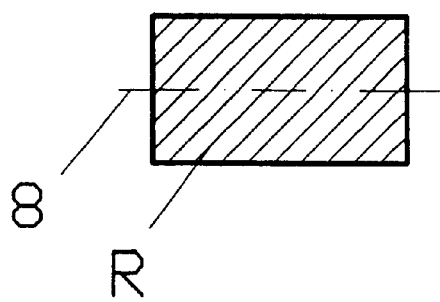

The present invention pertains to a process for manufacturing a ball-and-socket joint housing by cold forming.

Ball-and-socket joints are used in the automobile industry especially for steering tie rods or in wheel suspensions, where they must withstand sometimes extreme weather effects as well as mechanical or chemical stresses over a very long life cycle.

The increasing need to design ball-and-socket joints as low-weight ball-and-socket joints conflicts with these requirements. It is known in practice that ball-and-socket joint housings can be manufactured from a blank consisting of wire material, which is forged into a joint housing after being heated in a plurality of consecutive steps. Even though this energy- and labor-intensive process makes it possible to manufacture high-strength ball-and-socket joint housings, forged components also always have the drawback of having a very high own weight.

A process for manufacturing a joint housing for ball-and-socket joints has become known from DE 195 36 035 A1, which can be manufactured as a whole by cold forming. An axial depression with the diameter exceeding the diameter of the internal thread to be prepared later is prepared in the blank by reverse cup extrusion in order to subsequently reduce only the threaded area to the thread root core diameter with simultaneous deformation of the jacket surface into a wrench contact surface. Additional methods, such as upsetting, cupping, punching, calibration of both the outer contour and the inner contour of the joint housing, are subsequently necessary to finish the joint housing described in the said document. Moreover, it is necessary to tap an internal thread after the forming operation and, on the other hand, an annular groove is to be turned in for fastening a sealing bellows. In addition, no real weight reduction can be expected with such a design.

The basic technical problem of the present invention is to provide a process for manufacturing a ball-and-socket joint housing, which makes it possible to produce a ball-and-socket joint housing manufactured as a whole by cold forming in a light-weight design by forming operations.

This technical object is accomplished by the features of patent claim 1. For preparation for the forming of the blank cut off, which consists of a bar or wire material, it is helpful in the sense of the present invention to first press a trough-shaped depression into same or to pretreat the surface of the blank in order to be able to subsequently perform the forming processes with the highest accuracy and quality. For example, the centering of the blank in the forming die can be facilitated by the aforementioned preparatory actions. The prepared blank, which is usually called a plate bar, is first provided with an axial depression in a first operation by means of reverse cup extrusion, the axial direction being defined by a longitudinal axis of the blank. After the preparation of the first axial depression with a first diameter in the blank, a second axial depression is likewise prepared by reverse cup extrusion in the first axial depression prepared before in another operation. The second axial depression has a larger diameter compared with the diameter of the first axial depression. The first axial depression is thus widened. Deformation of the material, which also leads to a reduction in the diameter of the first axial depression in at least some sections, takes place within the ball-and-socket joint housing being formed during the second reverse cup extrusion.

The reverse cup extrusion makes it possible to manufacture very thin-walled metallic hollow bodies. This method is utilized in the case according to the present invention in two consecutive steps in order to manufacture a ball-and-socket joint housing produced as a whole by cold forming, which is designed as a hollow body in a light-weight design. This light-weight design makes it possible to reduce the weight to a hitherto unknown extent. Moreover, compacting of the material is achieved during the reverse cup extrusion as a consequence of the flow processes taking place in the material, so that the necessary strength requirements are met as well.

The first axial depression thus forms a cavity in the ball-and-socket joint housing finished later, while the second depression prepared later forms the bearing pot of the housing, which is provided to receive the ball-and-socket joint components such as the bearing shell and the ball pivot mounted therein.

Further embodiments of the process according to the present invention are described in the subclaims.

For example, the axial length of the second depression may be made shorter than the length of the first axial depression corresponding to an embodiment of the process according to the present invention. This case will occur mainly in the case of very long ball-and-socket joint housings which are used, e.g., in axial joints on steering tie rods.

Moreover, it is possible in a simple and advantageous manner during the performance of the reverse cup extrusion operation to make an axial pin integrally on the ball-and-socket joint housing at the same time. Furthermore, the ball-and-socket joint housing may be provided at the same time with an outer wrench contact surface during this first reverse cup extrusion operation, so that need for additional operations can be eliminated and the ball-and-socket joint housing can be manufactured at a very low cost. The wrench contact surface will be used later, during the installation of the ball-and-socket joint housing in the motor vehicle, e.g., to attach a tool. However, it is, of course, also conceivable to form the wrench contact surface integrally only during the second reverse cup extrusion operation.

According to one embodiment of the process according to the present invention, the axial pin has a thread, which is can be made integrally on the axial pin, e.g., i.e., rolled or tapped into the axial pin.

Figure 2:
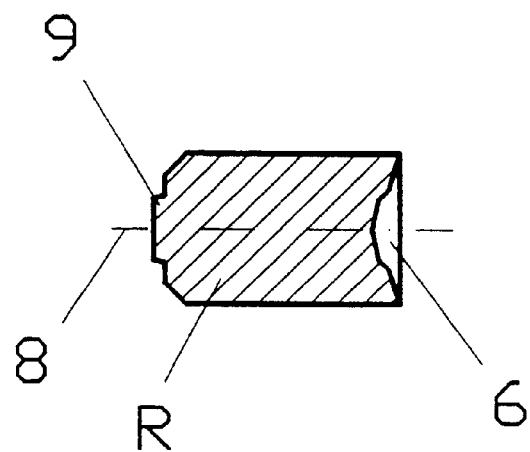
Figure 3:
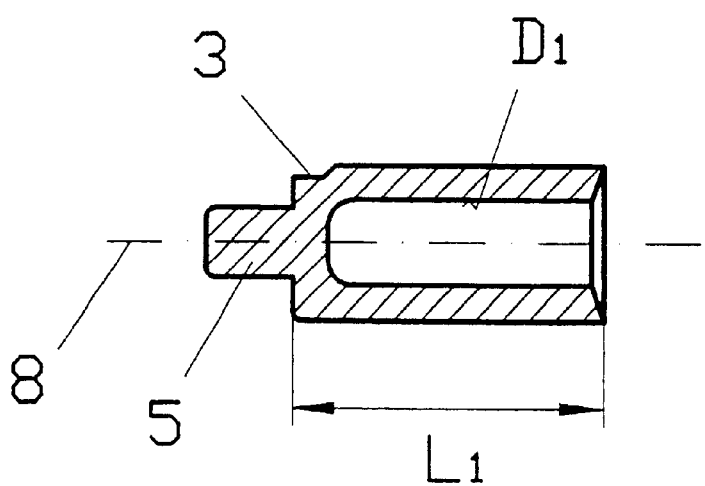
Figure 4:
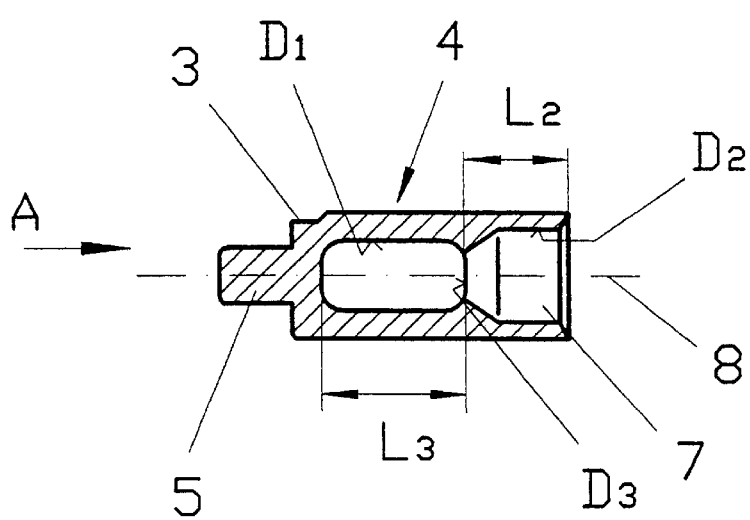
Figure 5:
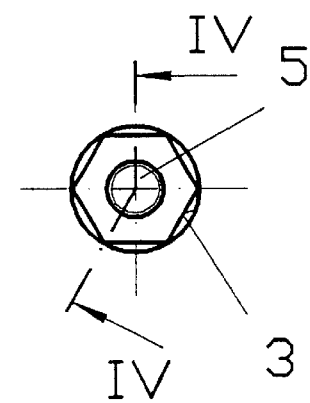

The following description of the process according to the present invention shall be illustrated on the basis of an exemplary embodiment by means of a stage plan, as can be seen in FIGS. 1–4. Furthermore, FIG. 5 shows a view of a ball-and-socket joint housing corresponding the direction of the arrow A in FIG. 4. In addition, the direction of the cut IV—IV, which corresponds to the view in FIG. 4, is shown in FIG. 5.

A blank R, as is shown in FIG. 1, is used in the process according to the present invention. This blank R consists of a bar or wire material. It correspondingly has a cylindrical cross section. Its longitudinal axis 8 also forms in this case the central axis of the later ball-and-socket joint housing. Besides prior-art surface treatments, which may be necessary for the further processing, the plate bar R shown in FIG. 2 is first prepared for preparing the blank. This plate bar has, on the one hand, a flat machined surface 9 and, opposite this surface, a trough 6, so that contact surfaces are prepared, on the whole, for the tools. Depending on the geometric dimensions of the blank R, recrystallization annealing of the blank may also be necessary. This is used to improve the properties of the material and is not necessarily carried out on each ball-and-socket joint housing.

At the beginning of the process according to the present invention for processing the blank R, a first axial depression 1 is prepared in the blank R by means of a reverse cup extrusion process, as is apparent from FIG. 3. This first axial depression 1 has a first diameter D1 as well as a first axial length L1. A wrench contact surface 3 as well as an axial pin 5 are made integrally simultaneously on the outer surface of the blank R during the first reverse cup extrusion operation. The final finishing of the ball-and-socket joint housing 4 according to the present invention is carried out already in the next step, as is shown in FIG. 4.

A second axial depression 2, which has a diameter D2 that is larger than the diameter D1 of the first axial depression, is correspondingly prepared in the first axial depression 1 in a second reverse cup extrusion operation. Moreover, the second axial depression 2 has a length L2, which is shorter in the example being shown than the remaining length L3 of the axial depression. Due to the deformation of the material, a section of reduced diameter, whose internal diameter D3 is very small, is formed between the first and second axial depressions. The bearing pot 7 formed as a result in the ball-and-socket joint housing 4 will be used later to receive the bearing shell for mounting the joint ball of a ball-and-socket joint pin. The material deformation to the diameter D3 subsequently takes place in the interior space of the ball-and-socket joint housing 4, so that the external diameter remains nearly constant during the forming. FIG. 5 shows once again a view in the direction of arrow A corresponding to the view in FIG. 4, which shows the axial pin 5 and the wrench contact surface 3 formed integrally on the outer circumference of the ball-and-socket joint housing 4.

LIST OF REFERENCE NUMBERS

1 First axial depression
2 Second axial depression
D1 First diameter
D2 Second diameter
D3 Third diameter
L1 First length
L2 Second length
R Blank
3 Wrench contact surface
4 Ball-and-socket joint housing
5 Axial pin
6 Trough
7 Bearing pot
8 Longitudinal axis
9 Surface

What is claimed is:

1. A process for manufacturing a ball-and-socket joint housing by cold forming from a blank produced from a bar or wire material and prepared for forming, the process comprising the steps of:
preparing a first axial depression in the blank with a diameter by reverse cup extrusion;
subsequently preparing a second axial depression with a comparatively larger diameter in the axial depression by reverse cup extrusion; and
forming a diameter reduction also of the first axial depression in some sections by the deformation of the material during the second reverse cup extrusion, wherein an axial pin is also formed integrally at the same time on the ball-and-socket joint housing during the first reverse cup extrusion operation.

2. A process for manufacturing a ball-and-socket joint housing in accordance with claim 1, wherein an external wrench contact surface is made integrally on the ball-and-socket joint housing during one of the reverse cup extrusion operations.

3. A process for manufacturing a ball-and-socket joint housing in accordance with claim 1, wherein a thread is made integrally on the axial pin or is tapped in the axial pin.

4. A process for manufacturing a ball-and-socket joint housing by cold forming from a blank produced from a bar or wire material and prepared for forming, the process comprising the steps of:
preparing a first axial depression in the blank with a diameter by reverse cup extrusion;
subsequently preparing a second axial depression with a comparatively larger diameter in the axial depression by reverse cup extrusion; and
forming a diameter reduction also of the first axial depression in some sections by the deformation of the material during the second reverse cup extrusion, wherein an external wrench contact surface is made during the first reverse cup extrusion operation.

5. A process for manufacturing a ball-and-socket joint housing by cold forming a blank, the process comprising the steps of:
preparing a first axial depression in the blank with a diameter by reverse cup extrusion;
subsequently preparing a second axial depression with a comparatively larger diameter in the axial depression by reverse cup extrusion; and
forming a diameter reduction also of the first axial depression in some sections by the deformation of the material during the second reverse cup extrusion wherein an axial pin is also formed integrally at the same time on the ball-and-socket joint housing during the first reverse cup extrusion operation.

6. A process far manufacturing a ball-and-socket joint housing in accordance with claim 5, wherein an external wrench contact surface is made integrally on the ball-and-socket joint housing during one of the reverse cup extrusion operations.

7. A process for manufacturing a ball-and-socket joint housing in accordance with claim 5, wherein a thread is made integrally on the axial pin or is tapped in the axial pin.

8. A process for manufacturing a ball-and-socket joint housing by cold forming from a blank produced from a bar or wire material and prepared for forming, the process comprising the steps of:
pressing a trough-shaped depression into the blank;
subsequently preparing a first axial depression in the blank with a diameter by reverse cup extrusion;
subsequently preparing a second axial depression with a comparatively larger diameter in the axial depression by reverse cup extrusion; and
forming a diameter reduction also of the first axial depression in some sections by the deformation of the material during the second reverse cup extrusion.

* * * * *